June 6, 1944.  F. B. HILMER ET AL  2,350,759
TRANSPORTATION OF FINELY DIVIDED SOLIDS
Filed Dec. 28, 1942
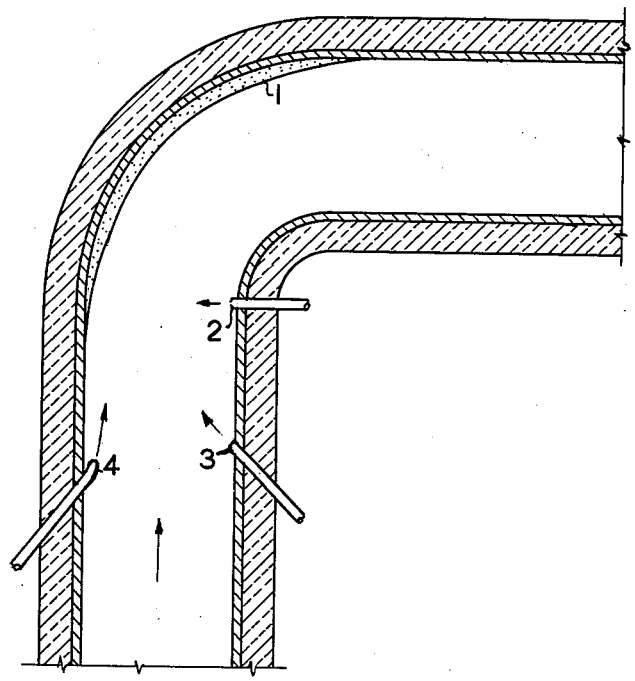
Inventors: Frederick B. Hilmer
Norman E. Peery
By their Attorney:

Patented June 6, 1944

2,350,759

UNITED STATES PATENT OFFICE 2,350,759

TRANSPORTATION OF FINELY DIVIDED SOLIDS

Frederick B. Hilmer, Berkeley, and Norman E. Peery, San Francisco, Calif., assignors to Shell Development Company, San Francisco, Calif., a corporation of Delaware Application December 28, 1942, Serial No. 470,418

10 Claims. (Cl. 196—52)

This invention relates to an improvement in the transportation of finely divided solids through curved conduits by means of gas streams. A particular aspect of the invention relates to an improvement in the methods of carrying out various catalytic conversions with finely divided solid catalysts wherein the catalyst is transported through curved conduits by gas streams.

In numerous processes finely divided solids are transported by means of gas streams through fixed conduits usually constructed of ferrous metals. In these various cases the conduits are subjected to more or less severe erosion and this is the cause of considerable difficulty. This erosion is largely concentrated on certain points of the conduits, notably on the deflecting surfaces of the bends. In many cases, this difficulty is largely overcome by inserting hardened steel wear plates in the bends. This is a fairly satisfactory expedient in many cases, even though it is sometimes necessary to replace the wear plates frequently. In many other cases, however, iron is a highly undesirable impurity and is not desired in the material transported. In these cases the use of steel wear plates is of little advantage since the eroded steel contaminates the transported material. In these cases it is often necessary to line the conduit particularly at points subjected to severe erosion with special alloys and other non-ferrous lining materials. These expedients operate satisfactorily but are generally very costly. Furthermore, the materials available are eroded much faster than steel and require frequent replacement.

According to the process of the invention, these difficulties are substantially overcome in a very simple and effective manner by forming a protective coating comprising the material transported on the surface of the conduit subjected to erosion. This is effected by wetting the surface subjected to erosion with a resinous bonding material to which a portion of the transported solids sticks and builds up a bonded protective coating. The protective coating formed consists essentially of the material transported; therefore, as the protective coating is eroded, no contamination of the transported material is caused thereby.

The wetting of the surface subjected to erosion with the liquid resinous bonding material may be effected in any convenient manner. One suitable and advantageous method is to spray or squirt the liquid bonding material onto the surface subjected to erosion. Thus, for example, in the conduit illustrated in the attached drawing, wherein the flow of material is upward as indicated, a suitable nozzle may be placed at one or more convenient points such as indicated and the liquid resinous bonding material sprayed or squirted therethrough in the approximate direction indicated by the arrows so as to wet the outside of the curve. This may, if desired, be effected while the conduit is in operation. In this method the amount of liquid resinous bonding material deposited upon the surface and, hence, the thickness of the protective layer 1 are more or less proportional to the amount of erosion. In cases where the conduit is not too large in diameter and the gas flow therethrough is not too great, a jet may be advantageously positioned at a point such as 2, 3 or 4. When the conduit is very large or the gas flow is high, a position near 4 may be more suitable. As the protective surface is eroded it may be intermittently renewed, thereby maintaining a protective coating for any protracted period.

In such cases where the conduit is operated at a relatively high temperature the resinous bonding material may be in the form of a solution in a suitable volatile solvent or in the form of a liquid thermo-setting resin such as used in making bonded abrasives (see, for example, J. Chem. Ed. 19, 125 (1942)). In such cases where the conduit is operated at ordinary temperatures or a slightly elevated temperature, a solution of a suitable resinous bonding material in a volatile solvent is preferred.

The process of the invention may be employed in any case where it is desired to transport a finely divided solid through a curved conduit with a gas or vapor stream. It is, however, particularly advantageous in such cases where it is desired to transport such materials with a minimum of contamination of the transported product with material eroded from the conduit; for instance, where it is desired to transport various materials through conduits constructed of ferrous metals and it is desired to maintain a minimum contamination of the transported material with iron.

The process of the invention is particularly advantageous in the execution of various catalytic conversion processes with finely divided non-ferrous catalysts which are poisoned by iron, especially when the catalyst is employed for a desired conversion in one converter and subsequently regenerated in a second converter by burning carbonaceous deposits therefrom. In such processes the resinous bonding material gradually eroded from the protective coating is continuously removed from the recycled catalyst in the regeneration step.

As examples of particularly suitable and advantageous applications of the process may be mentioned the various processes in which various hydrocarbon materials are treated in the vapor phase at relatively elevated temperatures with clay-type catalysts. Typical processes are, for example, catalytic cracking and isoforming. In these and similar processes hydrocarbon vapors are treated under cracking conditions or conditions of incipient cracking with finely divided catalysts consisting of various natural clay materials, treated clay materials or synthetic clay-like materials containing alumina and/or silica. Iron, being an active catalyst causing decomposition of hydrocarbon materials to carbon, is a very detrimental impurity and is excluded from these catalysts as far as possible. In these processes large amounts of the catalyst are continuously recycled in a gas stream through large conduits, often several feet in diameter, to the contact and regeneration zones, coolers, heaters, etc. During such transportation the catalyst gradually becomes contaminated with traces of ferrous metal eroded from the metal conduits. This causes increased carbon deposition on the catalyst in the reaction zone and results in decreased yields, decreased conversions, increased costs of regeneration and recycling, and the necessity of frequently replacing the catalyst with fresh iron-free catalyst. Since the erosion takes place predominantly on the deflecting surfaces of the bends in the conduits, the above-mentioned disadvantages may be largely overcome by the present method for decreasing such erosion.

We claim as our invention:

1. In the transportation of finely divided solids through curved conduits by means of a stream of vapors, the method of reducing erosion of the conduit and reducing contamination of the finely divided solid material which comprises intermittently wetting the conduit surface subjected to erosion while transporting said finely divided solids with a resinous bonding material whereby a portion of the transported solid material is caused to stick to the surface subjected to erosion and form thereon a protective coating.

2. In a catalytic conversion process wherein the finely divided solid catalyst is transported through a curved conduit by means of a stream of vapors, the method of reducing erosion of the conduit and reducing contamination of the finely divided solid catalyst which comprises intermittently wetting the conduit surface subjected to erosion while transporting said finely divided solid catalysts with a resinous bonding material whereby a portion of the transported catalyst is caused to stick to the surface subjected to erosion and form thereon a protective coating.

3. In the transportation of finely divided solids through curved conduits at elevated temperatures by means of a stream of vapors, the method of reducing erosion of the conduit and reducing contamination of the finely divided solid material which comprises intermittently wetting the conduit surface subjected to erosion while transporting said finely divided solids with a liquid thermo-setting resin whereby a portion of the transported solid material is caused to stick to the surface subjected to erosion and form thereon a protective coating.

4. In the transportion of finely divided solids through curved conduits at elevated temperatures by means of a stream of vapors, the method of reducing erosion of the conduit and reducing contamination of the finely divided solid material which comprises intermittently impinging upon the surface subjected to erosion while transporting said finely divided solids a liquid thermo-setting resin whereby a portion of the transported solid material is caused to stick to the surface subjected to erosion and form thereon a protective coating.

5. In a catalytic conversion process wherein a finely divided solid catalyst is contacted with vapors in a reaction zone and the partially spent catalyst is regenerated by burning off carbonaceous deposits in a separate regeneration zone and finely divided catalyst is transported to at least one of said zones at an elevated temperature through a curved conduit by means of a stream of gas, the method of reducing erosion of the conduit and reducing contamination of the catalyst which comprises intermittently wetting the conduit surface subjected to erosion while transporting said finely divided solid catalysts with a resinous bonding material whereby a portion of the transported solid material is caused to stick to the surface subjected to erosion and form thereon a protective coating.

6. In a process for the catalytic cracking of hydrocarbon oils wherein hydrocarbon oils to be cracked are contacted in the vapor phase in a reaction zone with a substantially iron-free cracking catalyst and partially spent catalyst is regenerated by burning off carbonaceous deposits in a separate regeneration zone and finely divided catalyst is transported to at least one of said zones at an elevated temperature through a curved conduit by means of a stream of gas, the method of reducing erosion of the conduit and reducing contamination of the catalyst which comprises intermittently wetting the conduit surface subjected to erosion while transporting said cracking catalyst with a resinous bonding material whereby a portion of the transported solid material is caused to stick to the surface subjected to erosion and form thereon a protective coating.

7. In a process for the catalytic cracking of hydrocarbon oils wherein hydrocarbon oils to be cracked are contacted in the vapor phase in a reaction zone with a finely divided synthetic blend of silica and alumina and partially spent catalyst is regenerated by burning off carbonaceous deposits in a separate regeneration zone and finely divided catalyst is transported to at least one of said zones at an elevated temperature through a curved conduit by means of a stream of gas, the method of reducing erosion of the conduit and reducing contamination of the catalyst which comprises intermittently wetting the conduit surface subjected to erosion while transporting said finely divided catalyst with a resinous bonding material whereby a portion of the transported solid material is caused to stick to the surface subjected to erosion and form thereon a protective coating.

8. In a process for the catalytic cracking of hydrocarbon oils wherein hydrocarbon oils to be cracked are contacted in the vapor phase in a reaction zone with a substantially iron-free cracking catalyst and partially spent catalyst is regenerated by burning off carbonaceous deposits in a separate regeneration zone and finely divided catalyst is transported to at least one of said zones at an elevated temperature through a curved conduit by means of a stream of gas, the method of reducing erosion of the conduit and reducing contamination of the catalyst which comprises intermittently wetting the conduit surface subjected to erosion while transporting said cracking catalyst with a liquid thermo-setting resin whereby a portion of the transported solid material is caused to stick to the surface subjected to erosion and form thereon a protective coating.

9. In a process for the catalytic cracking of hydrocarbon oils wherein hydrocarbon oils to be cracked are contacted in the vapor phase in a reaction zone with a substantially iron-free cracking catalyst and partially spent catalyst is regenerated by burning off carbonaceous deposits in a separate regeneration zone and finely divided catalyst is transported to at least one of said zones at an elevated temperature through a curved conduit by means of a stream of gas, the method of reducing erosion of the conduit and reducing contamination of the catalyst which comprises intermittently wetting the conduit surface subjected to erosion while transporting said cracking catalyst with a solution of a resinous bonding material in a volatile solvent whereby a portion of the transported solid material is caused to stick to the surface subjected to erosion and form thereon a protective coating.

10. The method according to claim 1 further characterized in that the resinous bonding material in liquid form is sprayed upon the surface undergoing erosion through the stream of transported material.

FREDERICK B. HILMER.
NORMAN E. PEERY.